Dec. 8, 1959      J. GILBERT      2,916,067
SLICING MACHINES
Filed April 9, 1958
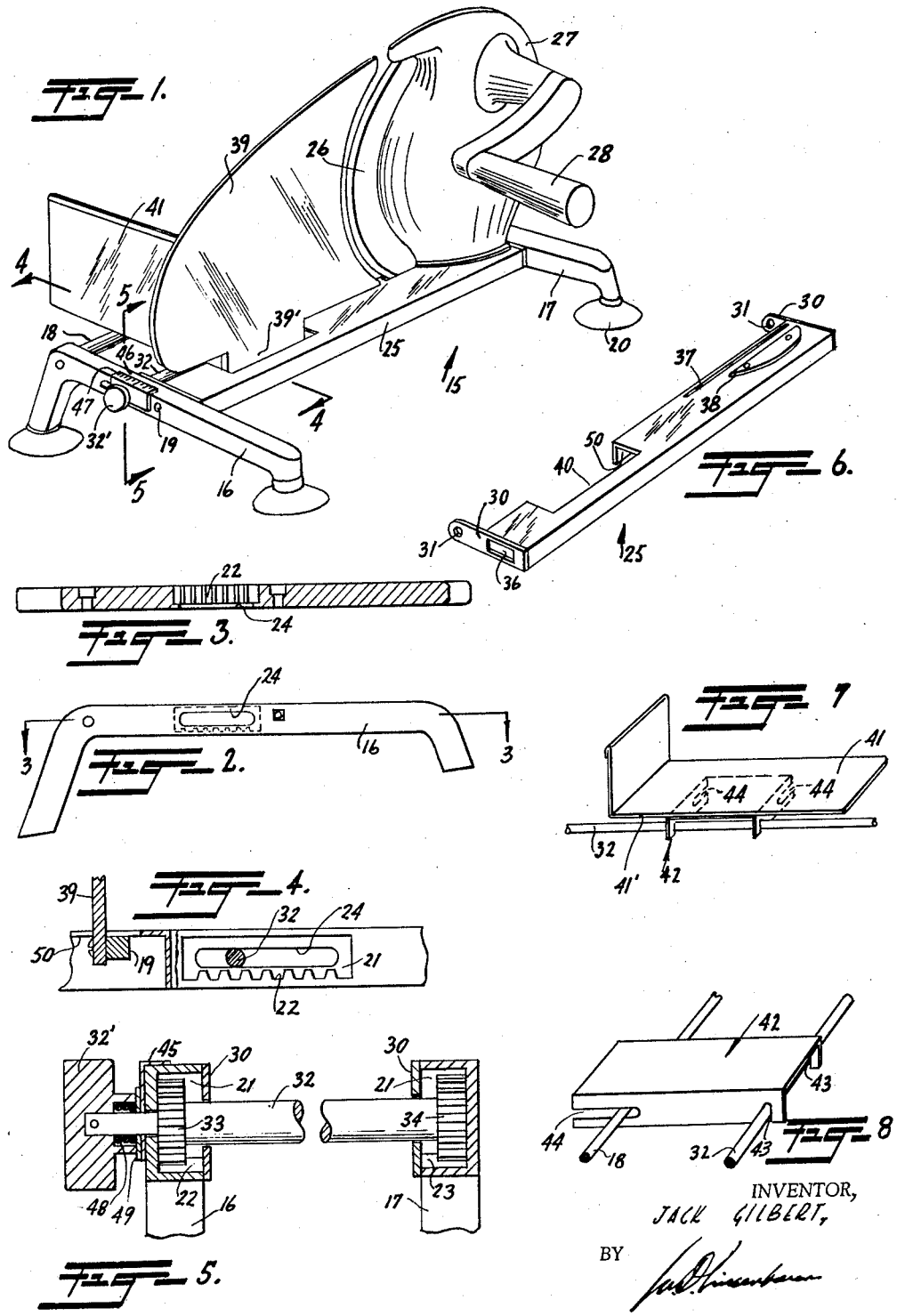
INVENTOR,
JACK GILBERT,
BY
ATTORNEY

United States Patent Office 2,916,067
Patented Dec. 8, 1959

2,916,067

SLICING MACHINES

Jack Gilbert, Newburgh, N.Y., assignor to General Slicing Machine Co., Inc., Walden, N.Y., a corporation of New York Application April 9, 1958, Serial No. 727,392

20 Claims. (Cl. 146—102)

The present invention relates to food slicing machines of the type in which a carriage having a food mass thereon, is slid to and fro past a cutting blade, but before each slicing operation, the food mass is shifted across the carriage against a gage plate which is in advance of and whose contacted surface is parallel to the blade plane. Since the blade is intermediate the carriage and the plane of said surface of the gage plate, the distance between said blade and surface planes, determine the thickness of slice effected. Altering such distance adjusts for slice thickness.

Heretofore, lateral movement of the gage plate was resorted to for adjustment for the thickness of slice; the blade plane being constant. Various devices have been used to adjust gage plate position, but these employ parts which in many instances are costly in themselves and always require much labor for assembly. Other devices for this function have proven unsatisfactory because if without a proper locking mechanism, the gage plate would be shifted by the impact of the food mass against it, which occurs before each slicing operation.

In this invention, the construction offers a gage plate fixed to frame and the blade is moved laterally for change of thickness of slice. The mentioned impacts cause no lateral movement of the blade because the food mass slides easily across the food carriage, and since the force applied to move the carriage is in a direction parallel to the blade plane, there is no disruption to any setting for slice thickness. Even slight frictional hold of the blade carriage here used, is sufficient to hold the set blade plane position.

However, lateral movement of the blade requires that the food carriage move laterally with it, since it is mandatory that the distance between the blade plane and the adjacent edge of the food carriage be constant.

It is therefore an object of this invention to provide a novel and improved construction for a slicing machine of the character set forth, in which the blade plane is adjustable laterally, the gage plate is fixed to frame and where the food carriage moves laterally with the blade and yet utilized a track fixed to frame to maintain the sturdiness of the entire structure.

Another object is to provide a new construction embodying the above features, permitting a minimum of frame and utilizing the tie rods connecting the frame parts as the track means and for the support of both the food and blade carriages.

A further object is to provide a novel and improved construction for slicing machines of the class set forth which cheapens the over all cost of manufacture and which is efficient in carrying out the required functions of the various components thereof.

Other objects and advantages will become apparent as this description and disclosure proceeds.

For the practice of this invention, one form it may assume, is to have a frame comprising horizontal front and rear parts connected by two parallel spaced rods. There is an elongated inverted box-like member horizontally positioned between the frame's front and rear parts, serving as the carriage for the blade and its guard housing. The box ends have horizontal slots which are opposite each other and extending tabs, each having a hole therethrough. These holes are in alignment and serve to position a turnable rod. The front frame member preferably, has a horizontal slot through which said rod extends and ends in a knob or other suitable handle to turn same. The rear end of said rod extends from the rear tab of the blade carriage into a cavity in the front surface of the rear frame member. There is a similar cavity in the rear surface of the front frame member. In said cavities, said frame members which are cast, there is a rack. Gears on the knobbed rod, mesh with said racks respectively. It is evident that upon turning the knob, the blade carriage will be moved laterally. Said knobbed rod is parallel to and intermediate the rods which connect the said frame's front and rear members. One of the frame-connecting rods is through the slots in the blade carriage ends and supports the blade carriage. The second frame-connecting rod which is of course a distance away from blade plane, and the knobbed rod on the carriage serve as the tracks for the food carriage. To be mounted properly on such track rods therefor, the underside of the carriage has two bearings. One of these bearings is slidable along the knobbed rod, but incapable of movement in a direction lateral of the blade. The second of these bearings is slidable along the track rod which is farthest from the blade, incapable of vertical movement, but provided with opening so that it can move laterally of the blade. Friction means holds the knobbed rod from accidental turning. The gage plate is fixed to the frame-connecting rod which supports the blade carriage and there are proper cut-outs in said carriage body for the bottom edge of the blade and to permit clearance of the gage plate when the blade carriage is moved.

In the accompanying drawing, similar characters of reference indicate corresponding parts in all the views; said drawing being part of this specification.

Fig. 1 is a perspective view of a food slicing machine embodying the teachings of this invention.

Fig. 2 is a front view of the front frame member included in said machine of Fig. 1.

Fig. 3 is a section taken at lines 3—3 in Fig. 2.

Fig. 4 is an enlarged fragmentary section taken at lines 4—4 in Fig. 1.

Fig. 5 is a fragmentary enlarged section taken at lines 5—5 in Fig. 1.

Fig. 6 is a perspective view of the blade carriage.

Fig. 7 is a perspective view of the food carriage drawn to a somewhat smaller scale than shown in Fig. 1.

Fig. 8 is a perspective view of the slide bearing structure of preferred design, for the food carriage.

In the preferred embodiment of this invention shown in the drawing, the slicing machine designated generally by the numeral 15, includes a frame base comprising the front frame member 16 and the substantially similar rear frame member 17, both connected by the parallel spaced rods 18 and 19 and provided at their distal ends with suction cups as 20 to serve as feet for the machine and for releasably mounting it on a table or counter surface for use. Between said rods and near the one marked 19, each of the frame members 16, 17 which are preferably cast, is provided with a socket 21 which may be rectangular in shape and along one horizontal wall of which there is the rack. These racks are indicated by the numerals 22 and 23 respectively. Along the socket in the front frame member, there is a horizontal slot 24. Said sockets and racks are opposite each other and the teeth of the racks are respectively in alignment, same being of equal pitch.

The numeral 25 indicates generally the member which is the carriage for the cutting blade 26 and its guard housing 27. In the embodiment shown, the blade is a rotatably mounted disc having a sharpened peripheral edge, and it is rotated by hand or by power. In the illustration, a crank handle 28 is provided for manual movement to rotate the blade while the food carriage 41 with a food mass thereon (not shown) is slid to and fro past the blade to effect slicing.

The blade carriage 25 may be an elongated open-top box structure, positioned inverted and having end tabs 30, each with a hole 31 therethrough to serve as the bearings for a rod or shaft 32 which carries fixed thereon the gears 33 and 34 outside said box structure; said gears being in meshed engagement respectively with the racks 22 and 23. The front frame member 16 has a horizontal slot 24 along its associated rack, through which slot, the shaft 32 extends forwardly. The front end of said shaft has a knob 32' fixed thereon to turn the same. Each of the ends of the blade carriage 25 is provided with a horizontal slot as shown at 36, so that said carriage is mounted on and supported by the connecting rod 19, on which said carriage 25 is laterally slidable. The numeral 37 is a slot in the blade carriage for the bottom of the cutting blade 26 to extend through and the numeral 38 is a seat for mounting the blade guard and housing 27. The gage plate 39 is fixed to and extends upwardly from the fixed rod 19, and the blade carriage 25 has the cut-out 40 to clear the neck 39' of the gage plate and permit movement of said blade carriage.

Fixed to and extending downwardly from the underside of the food carriage 41, is the slide bearing structure denoted generally by the numeral 42. This may be an inverted channel, whose side walls which are in a direction across the food carriage, are each provided with the aligned vertical slots 43 and the aligned elongated horizontal slots 44. These slots are really notches whose ends are semi-circular edges for slide fit on the shaft 32 and the fixed rod 18 respectively.

Of importance to note is that the food carriage 41 is fitted for sliding movement along its track rods 32 and 18, maintained against lateral movement with respect to the rod 32, but afforded lateral movement with respect to the rod 18. It is evident that upon lateral movement of the shaft 32 by turning its knob 32', the food carriage 41 will move laterally with the blade carriage 25. The distance between the blade plane and the adjacent edge 41' of the food carriage, remains a constant.

If desired, the angle piece 45 having a hole is mounted on the shaft 32 as shown in Figs. 1 and 5, to slide along the front frame member 16 on which a line or pointer marking 46 appears, to coincide with graduations 47 on said angle piece, so that a reading can be had indicating the thickness of slice to be effected at any setting of the blade carriage 25; such graduations being a scale measuring the distance between the food-contacted surface of the gage plate and the blade plane.

To secure the blade carriage 25 against accidental movement, a friction means may be provided, as for instance the compression coil spring 48 acting against a rubber washer 49 which is pressed thereby and causes friction against the front face of the front frame member 16 and thereby draws the shaft 32 forward and thereby the gear 33 into frictional contact with the floor of the socket 21 in said frame member.

It is advisable that the rod 19 be of square cross section or at least have a flat upper surface and that the undersurface 50 of the blade carriage 25 rest thereon so as to get better support for such carriage.

To set the machine for use, the knob 32' is turned to a setting for the required thickness of slice, and then operated in the usual manner.

This invention is applicable to both hand-driven and motor-powered slicing apparatus having either a rotary or reciprocating blade.

This invention is capable of numerous forms and various applications without departing from the essential features herein disclosed. It is therefore intended and desired that the embodiment shown herein shall be deemed merely illustrative and not restrictive and that the patent shall cover all patentable novelty herein set forth; reference being had to the following claims rather than to the specific description and showing herein.

I claim:

1. In a slicing apparatus of the type including a blade and a gage member in advance of said blade and a food carriage which reciprocates to the fro past the cutting edge of the blade and along the gage member, the invention which comprises having the food carriage and the blade movable also in a lateral direction and means associated with the blade and the food carriage making them movable together laterally; the gage member being fixed.

2. An apparatus as defined in claim 1, including means for moving one of the mentioned laterally movable parts in such lateral direction.

3. An apparatus as defined in claim 1, including means releasably holding one of the mentioned laterally movable parts against accidental movement in said lateral direction.

4. In an apparatus of the character described, the combination of a frame, a blade carriage having a cutting blade thereon operable to cut into material pressed against its cutting edge, a gage member positioned fixed on the frame in advance of the blade, presenting a surface substantially parallel to the blade; said blade carriage being mounted on the frame for movement laterally of said surface, a food carriage laterally movable in the direction of movement of the blade carriage and also movable to and fro past the cutting edge of the blade; the plane of the blade being between said surface of the gage member and the food carriage and means associating both carriages making them to move together in the mentioned lateral direction, upon such movement of one of them.

5. An apparatus as defined in claim 4, wherein the food carriage is mounted on the frame for its movement in the direction of movement of the blade carriage and also for its movement to and fro past the cutting edge of the blade and wherein the means associating both carriages for the mentioned lateral movement together, comprises a track member on the blade carriage; the food carriage engaging said track member for sliding movement therealong; said track member maintaining the food carriage against independent movement in said lateral direction.

6. An apparatus as defined in claim 4, including means for moving one of the carriages in the mentioned lateral direction; said means being movable on the frame and associated with said one carriage.

7. An apparatus as defined in claim 4, including means mounted on the frame, releasably holding one of the carriages against accidental movement in said lateral direction.

8. In a slicing apparatus, a frame, a first elongated track member mounted thereon, a blade carriage having a cutting blade thereon; said blade carriage being movably mounted on the frame whereby the blade moves laterally towards and away from said first track member, a second track member mounted on the blade carriage along and parallel to the first track member, a food carriage having a first bearing means fixed thereto, slidably fitted on the first track member for movement therealong and also for movement laterally thereof in the direction of movement of the blade carriage and a second bearing means fixed to said food carriage, slidably fitted on the second track member and maintained thereby against movement in said lateral direction and a gage member fixed on the frame in advance of the blade presenting a surface next to the plane of the blade and substantially parallel thereto; said track members being substantially parallel thereto also; the plane of the blade being between said surface of the gage member and the food carriage and said carriage being slidable along said track member to and fro past the cutting edge of the blade and along said surface of the gage member.

9. An apparatus as defined in claim 8, including means on the frame and associated with one of the carriages for moving such carriage in the mentioned lateral direction.

10. An apparatus as defined in claim 8, including means releasably holding one of the carriages against accidental movement in said lateral direction.

11. An apparatus as defined in claim 8, including means associated with the frame and the blade carriage for moving such carriage.

12. An apparatus as defined in claim 8, wherein the second track member is a shaft journalled for rotation on the blade carriage and including a gear fixed on said shaft and a rack fixed on the frame; said gear and rack being in meshed engagement, whereupon turning said shaft, both carriages will move in the mentioned lateral direction.

13. An apparatus as defined in claim 8, wherein the frame comprises a front and a rear frame member and wherein the first track member is a rod connecting such frame members and including a second rod connecting said frame members, positioned under the blade carriage; such carriage resting on said second rod.

14. An apparatus as defined in claim 8, wherein the second track member is a shaft journalled for rotation on the blade carriage and including a gear fixed on said shaft and a rack fixed on the frame; said gear and rack being in meshed engagement, whereupon turning said shaft, both carriages will move in the mentioned lateral direction and wherein the frame includes a front and a rear frame member; one of such members having a slot therethrough in the direction of the movement of the blade carriage; said shaft extending through said slot.

15. An apparatus as defined in claim 8, wherein the second track member is a shaft journalled for rotation on the blade carriage and including a gear fixed on said shaft and a rack fixed on the frame; said gear and rack being in meshed engagement, whereupon turning said shaft, both carriages will move in the mentioned lateral direction and wherein the frame includes a front and a rear frame member; each of said frame members having a slot therethrough in the direction of movement of the blade carriage; said shaft extending through said slot and including a handle means on the extending end of the shaft, a friction washer on such extending end and spring means interposed between said handle and washer biasing said washer against the frame member it is adjacent to.

16. An apparatus as defined in claim 8, including means having indicia which is visable on the blade carriage and the frame to indicate the distance between the mentioned surface of the gage member and the plane of the blade.

17. An apparatus as defined in claim 8, wherein the frame includes a front and a rear frame member; the blade carriage being between said frame members and wherein the second track member is a shaft journalled for rotation on the blade carriage, including two gears fixed on such shaft, a rack on each of the faces of said frame members which are opposite each other; said shaft extending to said faces respectively and said gears being in meshed engagement with said racks respectively.

18. An apparatus as defined in claim 17, wherein each of said racks is within a socket in said frame members respectively.

19. An apparatus as defined in claim 18, wherein one of the frame members has a slot therethrough in the direction of movement of the blade carriage; said slot being communicative with the socket in said frame member and the mentioned shaft extending through such slot and including handle means on the extending end of said shaft.

20. An apparatus as defined in claim 19, including a member carried on the mentioned shaft on the extending end of said shaft; said member riding along the frame member from which said shaft extends when said shaft is rotated and including indicia on said member which is on the shaft and on said frame member to indicate the distance between the mentioned surface of the gage member and the plane of the blade.

References Cited in the file of this patent
UNITED STATES PATENTS

| | | |
|---|---|---|
| 1,428,291 | Lucey | Sept. 5, 1922 |
| 2,742,067 | Coons et al. | Apr. 17, 1956 |
| 2,807,301 | Gilbert et al. | Sept. 24, 1957 |